Jan. 26, 1971 J. J. HORN 3,559,082

CIRCUIT FOR PROVIDING A PLURALITY OF SELECTABLE SWEEP WAVEFORMS

Filed Feb. 28, 1968

JOHN J. HORN
*INVENTOR*

*BY*

*BUCKHORN, BLORE, KLARQUIST & SPARKMAN*
*ATTORNEYS*

United States Patent Office 3,559,082

Patented Jan. 26, 1971

3,559,082

CIRCUIT FOR PROVIDING A PLURALITY OF SELECTABLE SWEEP WAVEFORMS

John J. Horn, Beaverton, Oreg., assignor to Tektronix, Inc., Beaverton, Oreg., a corporation of Oregon Filed Feb. 28, 1968, Ser. No. 709,072
Int. Cl. H03k 4/50
U.S. Cl. 328—181 23 Claims

ABSTRACT OF THE DISCLOSURE

An improved sweep circuit for an oscilloscope or the like includes a plurality of sweep generators operated by a plurality of selectable gating circuits. The gating circuits are biased such that each gating circuit, except a selected gating circuit, clamps a respective sweep generator in a nonoperative condition. A common input trigger receiving circuit not only receives input triggering signals, but also forms a multivibrator with a selected gating circuit. This multivibrator is operative for causing the selected gating circuit to clamp its associated sweep generator in a nonoperative condition only for the duration of an operating period of the multivibrator, corresponding to the holdoff period desired for the sweep generator. In the multivibrator, the selected gating circuit includes the timing means for determining a holdoff timing period appropriate for the associated sweep generator. At the conclusion of the multivibrator's operating period, the selected gating circuit causes the associated sweep generator to initiate a sweep waveform. Selection of a desired sweep waveform as well as the selection of an appropriate holdoff period may thus be accomplished by means of selecting a proper gating circuit.

BACKGROUND OF THE INVENTION

Figure 1:
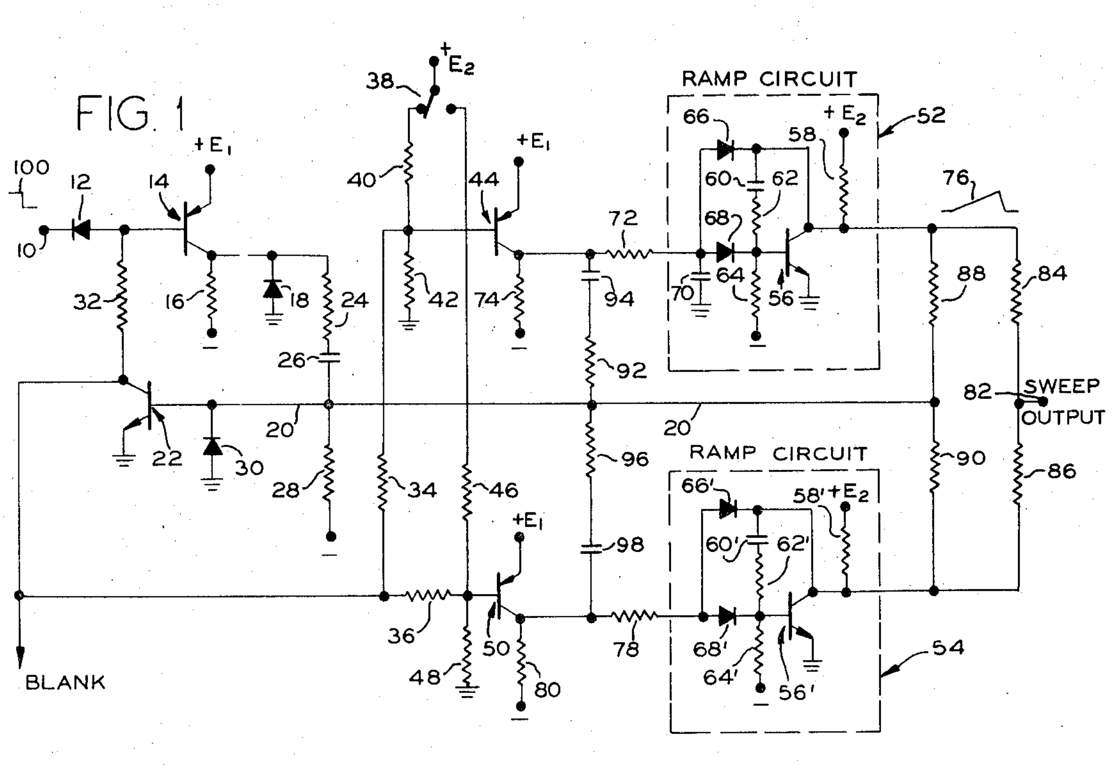

In a cathode ray oscilloscope, having an adjustable horizontal sweep, the duration of the desired sweep is ordinarily selected by switching a number of circuit components. For example, if an RC timing circuit is employed to determine the sweep in the oscilloscope sweep generator, both the capacitor and the resistor frequently must be switched to change from one time base to another. Moreover, the sweep generator often includes another timing circuit for disabling the sweep generator after the generation of a sweep waveform in order to prevent the reinitiation of another sweep waveform until the conclusion of a predetermined recovery time or holdoff period. Not only must the primary sweep-determining timing elements of a sweep generator be switched in selecting a sweep duration, but also the holdoff timing elements must be changed so that the holdoff period will be appropriate for the newly selected sweep. Thus, if a larger sweep circuit capacitor is selected for providing a sweep waveform of longer duration, a longer holdoff period must be set so that the aforementioned larger capacitor will have sufficient time to discharge before the sweep operation is repeated. Thus, many and complicated multiposition switches are frequently employed in changing from one horizontal sweep to another. Not only does this arrangement tend to be space consuming, but also necessitates the extension of timing circuit wiring, for example to the front panel of the instrument, resulting in inaccurate timing, cross-talk, and the like.

SUMMARY OF THE INVENTION

According to the present invention, a circuit for providing a plurality of sweep waveforms employs a plurality of sweep generator means. Each of the separate sweep generator means has a selectable operating circuit or gating means associated therewith which is operable for bringing about the generation of a sweep waveform from the given sweep generator means. A common input trigger receiving circuit is coupled to each of the operating circuits or gating means, while switchable means are employed for selecting one of the operating circuits or gating means. For example, a switchable means may comprise a D.C. bias network including a single switch which can be remotely located on the front panel of the instrument. In this manner, a plurality of timing circuit elements need not be directly switched at the front panel.

According to a preferred form of the present invention, a selected operating circuit or gating means forms a sweep holdoff timing circuit or a multivibrator with the input trigger receiving circuit. In an operated condition, this multivibrator disables the selected sweep generator means for a period of time approximately corresponding to the desired holdoff period or recovery period for the sweep generator means. The timing means for the multivibrator is included in the selected operating circuit or gating means whereby the holdoff timing changes with the sweep waveform timing as different operating circuits or gating means are selected. At the conclusion of the operating period for the multivibrator, the operating circuit or gating means causes the associated sweep circuit to initiate another sweep waveform. Thus, in a preferred form of the present invention, both the sweep circuit timing and the holdoff timing therefor may be switched remotely by a single D.C. bias switch, greatly simplifying the problems associated with conventional horizontal sweep selection.

It is accordingly an object of the present invention to provide an improved sweep circuit for generating selectable sweep waveforms.

It is another object of the present invention to provide an improved sweep circuit for generating selectable sweep waveforms without directly switching timing circuit components.

It is another object of the present invention to provide an improved sweep circuit wherein one of a plurality of sweep waveforms may be remotely selected.

It is another object of the present invention to provide an improved sweep generator for generating selectable sweep waveforms which generator may be either synchronized with a triggering input or allowed to free-run in the absence of a triggering input.

It is a further object of the present invention to provide an improved sweep circuit for generating selectable sweep waveforms wherein both the sweep waveform timing and the holdoff timing are remotely determined by a switchable D.C. bias.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

Figure 2:
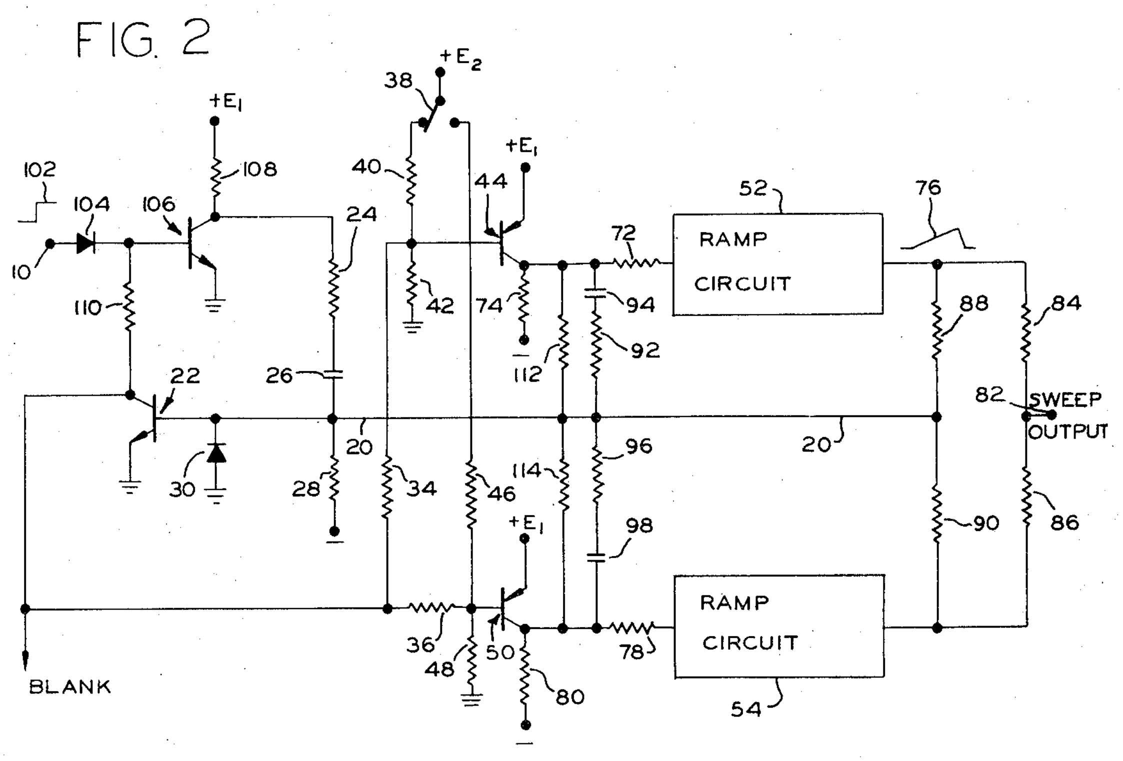

FIG. 1 is a schematic diagram of a first circuit according to the present invention; and FIG. 2 is a schematic diagram of a second circuit according to the present invention.

DETAILED DESCRIPTION

According to FIG. 1, illustrating a first embodiment of the present invention, a circuit for providing a plurality of selectable waveforms includes an input terminal 10 to which input triggering signals may be applied. The input triggering terminal 10 is connected to the cathode of input diode 12, the anode of which is connected to the base of PNP transistor 14. The emitter of transistor 14 is connected to a positive voltage, designated $+E_1$, and the collector is returned to a negative voltage, designated $-E$, through load resistor 16. Clamping diode 18 has its cathode connected to the collector of transistor 14 and its anode returned to ground. The collector of transistor 14 is also coupled to feedback line 20, and to the base of transistor 22, through the series combination of resistor 24 and capacitor 26.

The base of NPN transistor 22 is returned to the voltage $-E$ through base resistor 28 while the base of transistor 22 is also clamped so that it may not fall below ground level by clamping diode 30, the cathode of which is connected to the base of transistor 22, and the anode of which is grounded. The emitter of transistor 22 is grounded, and its collector is coupled to the base of transistor 14 by way of resistor 32. The circuit thus far described, including transistors 14 and 22, comprises a common input trigger receiving circuit. Blanking signals are provided at the collector of transistor 22, and the transistor 22 also drives a selected gating circuit as hereinafter more fully described.

The collector of transistor 22 is coupled through resistors 34 and 36 respectively to a switchable bias network or circuit. This bias network employs a switch 38, here illustrated as a single pole, double throw switch, the movable contact of which is connected to a positive voltage designated $+E_2$. In the switch position as shown, switch 38 connects the voltage $+E_2$ to a series circuit comprising resistors 40 and 42 disposed in that order between a switch contact and ground. The center tap of the voltage divider thus formed by resistors 40 and 42 is connected to the base of PNP gating circuit transistor 44 and also to the end of resistor 34 remote from the collector of transistor 22. The remaining contact of switch 38 is connected to ground through the series combination of resistors 46 and 48, wherein the center tap between the resistors is connected to the base of PNP gating circuit transistor 50, as well as to the remote end of resistor 36 from the collector of transistor 22.

The gating circuits including transistors 44 and 50 form operating means for enabling sweep generator means comprising ramp circuits 52 and 54, respectively. These sweep generator means comprise Miller integrator circuits. Referring to ramp circuit 52, an NPN transistor 56, the emitter of which is grounded, has its collector connected to a positive voltage $+E_2$ through resistor 58. A feedback capacitor 60 in series with a compensating resistor 62 is connected between the collector of transistor 56 and its base, while a current source resistor 64 returns the base of transistor 56 to a negative voltage, designated $-E$. The cathode terminals of clamping diodes 66 and 68 are connected respectively to the collector and base terminals of transistor 56, while the anodes of these diodes are connected together and returned to ground by means of capacitor 70. The junction of the anodes of diodes 66 and 68 is also coupled to the collector of gating circuit transistor 44 through resistor 72, while the collector of transistor 44 is also returned to a negative voltage $-E$ through resistor 74. The emitter of transistor 44 is returned to a positive voltage $+E_1$.

When transistor 44 conducts, and the collector thereof rises to a positive voltage near $+E_1$, a positive voltage is applied to the anodes of diodes 66 and 68 whereby these diodes conduct, and capacitor 60 is discharged. However, when transistor 44 does not conduct, its collector drops substantially to the voltage $-E$, and diodes 66 and 68 are nonconducting. Therefore, capacitor 60 may charge through current source resistor 64. The waveform appearing at the collector of transistor 56 as a result of the charging of capacitor 60 is indicated at 76. The transistor 56 acts to maintain a substantially constant charge current through capacitor 60 whereby waveform 76 is linear.

Thus, if the current through resistor 64 increases, the voltage at the collector of transistor 56 decreases whereby such current is reduced. Likewise, if the current through resistor 64 should drop, the voltage at the collector of transistor 56 increases such that the current rises to its correct value. At the end of the sweep waveform, gating circuit transistor 44 conducts once more whereby diodes 66 and 68 conduct and discharge capacitor 60. In the ramp circuit 52, capacitor 70 is employed to slow the application of clamping to capacitor 60 and discharge thereof so as to allow blanking of the oscilloscope before the sweep waveform at 76 is actually concluded.

The ramp circuit 54 is nearly identical to ramp circuit 52, and the elements thereof are referred to by primed reference numerals. The principal difference is that the capacitor 60' and resistor 64' define a different time constant so that sweep waveform output provided in ramp circuit 54 has a different duration and slope from that provided by circuit 52. In the illustrated embodiment, for example, ramp circuit 52 generates a waveform used in an oscilloscope for displaying television horizontal rate waveforms, while the circuit 54 output is appropriate for displaying television vertical rate waveforms. Thus, the time constant of circuit 54, and specifically principally that of capacitor 60' and resistor 64', is appreciably longer than the time constant associated with circuit 52. Also, it has been found that a capacitor 70 is not necessary to the operation of circuit 54. It is understood that the utilization of the present sweep circuit for display of television waveforms is by way of example only, and the circuit is obviously applicable for the display of other waveforms of varying duration and repetition rate.

Ramp circuit 54 is driven from the collector of gating circuit transistor 50 through coupling resistor 78 while the collector of transistor 50 is also returned to a negative voltage $-E$ through resistor 80. The emitter of transistor 50 is connected to the positive voltage $+E_1$.

The collectors of transistors 56 and 56' are connected to a common sweep output terminal 82 by way of resistors 84 and 86 respectively. The same collectors are also coupled to feedback line 20 through resistors 88 and 90, respectively. Feedback line 20, in addition to being coupled to the input trigger receiving circuit as hereinbefore indicated, in also coupled to the collector of gating circuit transistor 44 through the series combination of resistor 92 and capacitor 94. Similarly, the feedback line is coupled to the collector of gating circuit transistor 50 through the series combination of resistor 96 and capacitor 98. The combination of resistor 92 and capacitor 94 provides a holdoff timing means which is thus included in and selected with the gating circuit including transistor 44. Similarly, the combination of resistor 96 and capacitor 98 forms a holdoff timing means included in and selected with the remaining gating circuit, i.e. with transistor 50.

Considering the operation of the present invention, let us assume that switch 38 is in the left hand position, as shown, whereby resistor 40 is connected to the voltage $+E_2$. Since the remaining contact of the switch is left disconnected, the base of transistor 50 is supplied current through resistor 48 which permanently turns on transistor 50 as long as the switch 38 is in the aforementioned position. Transistor 50 acts to clamp ramp circuit 54 in the nonoperative condition, that is, wherein capacitor 60' is substantially discharged and no sweep output is produced from ramp circuit 54. However, the base of transistor 44 is at a more positive voltage determined by the constants of the voltage divider comprising resistors 40 and 42. Transistor 44 is biased thereby so that its condition is controlled by the state of transistor 22 through resistor 34. Transistor 44 will be turned on, and ramp circuit 52 will be clamped, only when transistor 22 is turned on such that the collector voltage of the latter transistor drops towards ground.

A negative-going pulse 100 at input terminal 10 causes diode 12 to conduct, and also causes conduction through transistor 14. The collector of transistor 14, which was theretofore clamped at ground level by operation of diode 18 in conjunction with resistor 16, will now rise nearly to $+E_1$. The positive voltage transient at the collector of transistor 14 is coupled to the base of transistor 22 through the circuit comprising resistor 24 and capacitor 26.

Let us assume that ramp circuit 52 is generating an output waveform 76. When waveform 76 has not risen very far, the base of transistor 22 will be clamped to ground, that is, in the off state, by the combination of diode 30 and resistor 28. The current at this time through resistor 88 is quite small. As the waveform 76 rises, the current through resistor 88 increases until it is enough to overcome the bias on diode 30. At a point determined by the relative values of resistors 24 and 88, a positive transition at the collector of transistor 14, corresponding to a negative going pulse 100, will cause transistor 22 to conduct. The resulting negative swing at the collector of transistor 22 is coupled to the base of transistor 44 by resistor 34 causing transistor 44 to turn on, thereby clamping ramp circuit 52 by means of diodes 66 and 68. Thus, the sweep waveform 76 is concluded substantially at the occurrence of a given input pulse 100.

The positive swing at the collector of transistor 44 is fed back to transistor 22 through the series combination of capacitor 94 and resistor 92, causing both transistor 44 and transistor 22 to remain on for a holdoff period determined by capacitor 94 and resistor 92. Resistor 32 also provides current for maintaining transistor 14 in an on condition at this time to prevent the trailing edge of an input pulse from interfering with the operation of the circuit. Transistors 44 and 22 form a multivibrator or sweep holdoff timing circuit, the on-time or the operating time of which is determined by the timing means associated with transistor 44, i.e. capacitor 94 in series with resistor 92. When capacitor 94 is nearly charged, transistor 22 turns off, causing transistor 44 also to turn off thereby unclamping the ramp circuit 52. At this time, capacitor 60 begins to charge, and another waveform 76 is automatically generated. The input trigger receiving circuit including transistors 14 and 22 will not be receptive to another triggering input for initiating operation of the aforementioned multivibrator until waveform 76 reaches a point where it provides a sufficient current to the feedback line through resistor 88.

The operating time of the multivibrator comprising transistors 22 and 44 defines a holdoff period during which ramp circuit 52 is inoperative, allowing the charge on capacitor 60 to be completely discharged and for the circuit to return to a stabilized condition.

In the event that an input pulse 100 does not arrive at terminal 10 within a predetermined time, the current through resistor 88 will by itself overcome the bias on diode 30 and initiate the operation of the multivibrator comprising transistors 22 and 44 for reclamping the capacitor 60 of ramp circuit 52. Thus, in the absence of input triggering signals, the FIG. 1 sweep circuit is free running and will continue to provide sweep waveforms such as indicated at 76. However, when a triggering input is received, the circuit will be immediately synchronized therewith.

It should be observed that when switch 38 is moved to its opposite position, ramp circuit 52 will remain clamped, and ramp circuit 54 will either free-run or will provide a sweep output synchronized with input triggering signals applied at terminal 10. The gating circuits including transistors 44 and 50 thus comprise selectable operating means for the ramp circuits 52 and 54. Not only is the ramp circuit or sweep generator in each case switched, but the holdoff timing appropriate therefor is switched at the same time by the same gating circuit. Although only two ramp circuits 52 and 54 with their associated gating circuits including transistors 44 and 50 respectively are illustrated, it is apparent that a larger number of ramp circuits may be selected in a similar manner, wherein all but one of the ramp circuits is permanently maintained in clamped condition so long as the switch 38 does not apply a selecting voltage to the associated gating circuit.

It is observed that the input trigger receiving circuit including transistors 14 and 22 is common to all the ramp circuits and gating circuits, and that only a D.C. voltage need be switched at switch 38 to choose the particular sweep output desired. Therefore, no timing voltage appears on the switching lead and the single switch may be remotely located without causing improper operation, crosstalk, or the like.

A modification of the invention is illustrated in FIG. 2 wherein like elements are referred to employing like reference numerals. The circuit of FIG. 2 is triggerable by a positive-going input triggering signal 102 for initiating a sweep waveform by a selected ramp circuit 52 or 54, whereas in the FIG. 1 circuit the input triggering signal initiated the holdoff period or operating period of transistors 22 and 44. Terminal 10 in the FIG. 2 circuit is connected to the anode of an input diode 104, the cathode of which is connected to NPN transistor 106. The emitter of transistor 106 is connected to ground while its collector is coupled to a positive voltage $+E_1$ through load resistor 108. The collector of transistor 106 is coupled to the base of transistor 22 through the series combination of resistor 24 and capacitor 26, while the collector or transistor 22 is coupled to the base of transistor 106 by way of resistor 110. Thus, in the FIG. 2 circuit, transistors 106 and 22 form an input trigger receiving circuit. A positive going portion of a waveform is effective in the FIG. 2 circuit for initiating operation of the input trigger receiving circuit whereas a negative going portion of a waveform was similarly effective in the FIG. 1 specific embodiment.

In the FIG. 2 circuit a resistor 112 is shunted across the series combination of resistor 92 and capacitor 94, while a similar resistor 114 is shunted across the series combination of resistor 96 and capacitor 98. As will hereinafter become more evident, resistor 112, for instance, maintains the multivibrator comprising transisors 22 and 44 in the operated or on condition for a period longer than a predetermined holdoff period.

The operation of the circuit of FIG. 2 is substantially similar to that of the FIG. 1 circuit, except as hereinafter indicated. Assuming ramp circuit 52 is providing a sweep waveform 76, this waveform, when it reaches a predetermined value, will be effective in providing enough current through resistor 88 for turning on transistor 22. Transistor 22, in turn, turns on transistor 44 as in the previous embodiment, with transistors 22 and 44 forming a multivibrator having an on time, in the instance of the present embodiment, at least as long as a predetermined holdoff period. The holdoff period is determined by feedback capacitor 94 and resistor 92. Transistor 106 is also turned on at the same time as transistor 22. As capacitor 94 charges, transistor 22 will be maintained in the on condition and also, at the conclusion of a predetermined holdoff period when capacitor 94 is nearly fully charged, transistor 22 will still be maintained in the on condition by current flowing through resistor 112. At this time, however, a positive going input triggering signal 102 can turn on transistor 106 whereby the collector of transistor 106 drops in voltage toward ground. The transition is coupled through resistor 24 and capacitor 26 to the base of transistor 22, and this transition will be large enough at or after the conclusion of the holdoff period defined by capacitor 94 and resistor 92 so that transistor 22 will be turned off, thus concluding the operating period of the multivibrator. Therefore, transistor 44 will be turned off allowing ramp circuit 52 to again produce sweep output 76.

As in the previous circuit, switch 38, which may be positioned at a remote location, is effective to select a given ramp circuit 52 or 54 or other ramp circuits that may be similarly provided. In the FIG. 2 circuit, a sweep output occurs when a triggering input signal 102 concludes the operating cycle of the multivibrator to initiate a sweep output, rather than to conclude the sweep output as in the FIG. 1 embodiment.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A circuit for providing a plurality of selectable sweep waveforms comprising:
- a plurality of sweep generator means,
- a plurality of selectable operating means for bringing about the generation of a sweep waveform from one of said sweep generator means,
- a common input trigger receiving circuit coupled to each of said selectable operating means, said common input trigger receiving circuit together with a selected operating means forming a multivibrator responsive in its operation to a common input trigger,
- and switchable means for selecting one of said operating means.

2. A circuit for providing a plurality of selectable sweep waveforms comprising:
- a plurality of sweep generator means,
- a plurality of selectable operating means for bringing about the generation of a sweep waveform from one of said sweep generator means,
- a common input trigger receiving circuit coupled to each of said selectable operating means, wherein said common input trigger receiving circuit forms a multivibrator with a said selectable operating means to provide a holdoff period during which said selectable operating means disables its associated sweep generator means and at the end of which the selectable operating means causes its associated sweep generator means to initiate a sweep waveform,
- and switchable means for selecting one of said operating means.

3. The circuit according to claim 2 wherein each of said selectable operating means includes timing means for determining the operating time of said multivibrator appropriate to the duration of the sweep produced by the associated sweep generator means.

4. A circuit for providing a plurality of selectable sweep waveforms comprising:
- a plurality ow sweep generator means timed to provide sweep waveforms of different duration,
- a plurality of selectable gating circuit means including a gating circuit means associated with each sweep generator means for bringing about operation thereof to provide a sweep waveform, said gating circuit means respectively including sweep holdoff timing means for determining sweep holdoff period timing appropriate for the associated sweep generator's waveform,
- input circuitry for receiving an input triggering signal and for cooperating with said gating circuit means for providing a sweep holdoff timing circuit in conjunction therewith effective for preventing reinitiation of a sweep waveform after a previous waveform until after a holdoff period,
- and means for selecting one of said gating circuit means to select the sweep generator means associated therewith.

5. The circuit according to claim 4 wherein said input circuitry for receiving an input triggering signal and cooperating with said gating circuit means for providing a sweep holdoff timing circuit therewith is common to plural selectable gating circuit means and receives a common input triggering signal, said input circuitry forming a sweep holdoff timing circuit with the selected gating circuit means.

6. The circuit according to claim 5 wherein said input circuitry for receiving an input triggering signal and for cooperating with said gating circuit means for providing a sweep holdoff timing circuit therewith comprises, with said gating circuit means, a multivibrator circuit triggerable from one state to another and operative during a holdoff period to disable the selected sweep generator at least for a time principally determined by said sweep holdoff timing means included in the selected gating circuit means.

7. The circuit according to claim 4 wherein each sweep generator means comprises a Miller integrator circuit including a feedback capacitor and wherein each said gating circuit means functions to clamp the feedback capacitor associated with the corresponding sweep generator means during the holdoff period as determined by the holdoff timing means included in said gating circuit means.

8. The circuit according to claim 6 wherein said gating circuit means causes initiation of a sweep at the conclusion of the operating time of said multivibrator corresponding to the end of a holdoff period.

9. The circuit according to claim 5 wherein said input circuitry for receiving an input triggering signal and cooperating with said gating circuit means for providing a holdoff timing circuit therewith is responsive to an input triggering signal for ending a sweep waveform by starting the holdoff period, wherein the selected gating circuit means automatically initiates another sweep by the selected sweep generator means at the end of the holdoff period.

10. The circuit according to claim 9 wherein said input circuitry for receiving an input triggering signal and cooperating with said gating circuit means for providing a holdoff timing circuit therewith is also responsive to the waveform produced by said sweep generator to prevent said circuitry from being responsive to a triggering signal to start a holdoff period until the sweep waveform reaches a predetermined value.

11. The circuit according to claim 10 wherein said input circuitry for receiving an input triggering signal and cooperating with said gating circuit means for providing a holdoff timing circuit therewith is additionally responsive to said sweep waveform alone for starting the holdoff period when said sweep waveform reaches a predetermined value so that the sweep generator will freely run in the absence of input triggering signals.

12. The circuit according to claim 5 wherein said input circuitry for receiving an input triggering signal and cooperating with said gating circuit means for providing a holdoff timing circuit therewith is responsive to an input triggering signal at the conclusion of the holdoff period for changing the state of the holdoff timing circuit to initiate another sweep by the selected sweep generator means.

13. The circuit according to claim 12 wherein said input circuitry for receiving an input triggering signal and cooperating with said gating circuit means for providing a holdoff timing circuit is responsive to the sweep waveform produced by sweep generator means so that a holdoff period is started by a predetermined value of sweep waveform.

14. A circuit for providing a plurality of selectable sweep waveforms comprising:
- a plurality of Miller integrator sweep circuits each including a feedback capacitor, said sweep circuits being coupled to provide a common sweep output,
- a plurality of gating circuits associated respectively with said sweep circuits for unclamping the feedback capacitor associated with each sweep circuit to initiate a sweep waveform and for clamping said feedback capacitor to conclude a sweep waveform, said gating circuits including holdoff timing means coupled thereto and operated thereby when the associated sweep circuit capacitor is clamped for providing holdoff period timing appropriate for the sweep circuit, a switchable bias network for applying a voltage to all but a selected one of said gating circuits so that all but a selected one of said gating circuits permanently clamps the feedback capacitor of the associated sweep circuit as long as the bias applied remains the same, and common input trigger receiving means for selectively forming a multivibrator with a selected gating circuit which selected gating circuit does not clamp the feedback capacitor of the associated sweep circuit, except when the multivibrator is in an operative condition during an operative period for the multivibrator corresponding at least to the holdoff period, the selected gating circuit operating to unclamp the feedback capacitor of the associated sweep circuit at the conclusion of the operating period of the multivibrator.

15. The circuit according to claim 14 further including means coupling the output of the respective sweep circuits to said common input trigger receiving means for enabling said common input trigger reeciving means to receive a trigger and initiate a holdoff period when the sweep waveform output reaches a predetermined value.

16. The circuit according to claim 15 wherein the common input trigger receiving means is also responsive to a predetermined value of a sweep circuit output alone for initiating a holdoff period.

17. The circuit according to claim 14 wherein said common input trigger receiving means is responsive to a sweep generator waveform output for initiating the holdoff period, and is responsive to a triggering signal for changing the state of the multivibrator at the conclusion of the holdoff period causing a selected gating means to unclamp the feedback capacitor for the associated sweep circuit to initiate a sweep.

18. The circuit according to claim 14 further including a remotely located switch connected to the bias network interconnected with the gating circuits to remotely select one of said gating circuits.

19. The circuit according to claim 14 wherein each of said gating circuits comprises a transistor coupled for clamping and unclamping an associated sweep circuit capacitor and having a said holdoff timing means connected to the output of such transistor, and wherein said common input trigger receiving means comprises an additional transistor connected to form a multivibrator with the selected gating circuit transistor.

20. The circuit according to claim 19 wherein said common input trigger receiving means further includes a third transistor for coupling an input triggering signal in operative relation to said additional transistor.

21. A circuit for providing a plurality of selectable sweep waveforms comprising:

a plurality of sweep generator means coupled to a common output, common input trigger receiving means, a plurality of selectable operating means for bringing about the generation of a sweep waveform from one of said sweep generator means in response to an input trigger, a common holdoff circuit responsive to said common output and including holdoff timing means for determining holdoff periods for said sweep generators, and D.C. bias means for selecting a given operating means together with simultaneous selection of an appropriate holdoff timing means for the sweep generator means, the operation of which is brought about by the given operating means.

22. A circuit for providing a plurality of selectable sweep waveforms comprising:

a plurality of sweep generator means, a plurality of selectable operating means for bringing about the generation of a sweep waveform from one of said sweep generator means, a common input trigger receiving circuit coupled to each of said selectable operating means, wherein said common input trigger receiving circuit forms a multivibrator with a said selectable operating means to provide a holdoff period during which said selectable operating means disables its associated sweep generator means and at the end of which the selectable operating means is responsive to an input trigger for causing the associated sweep generator means to initiate a sweep waveform, and switchable means for selecting one of said operating means.

23. The circuit according to claim 22 wherein each of said selectable operating means includes timing means for determining the operating time of said multivibrator appropriate to the duration of the sweep produced by the associated sweep generator means.

References Cited

UNITED STATES PATENTS

| | | | |
|---|---|---|---|
| 2,989,885 | 6/1961 | Pearson | 84—1.26X |
| 3,408,580 | 10/1968 | Moriyasu | 307—228X |
| 3,459,969 | 8/1969 | Jasper | 307—262 |

STANLEY D. MILLER, Jr., Primary Examiner

U.S. Cl. X.R.

307—228, 273; 328—185